(12) United States Patent
Jei

(10) Patent No.: US 7,424,285 B2
(45) Date of Patent: Sep. 9, 2008

(54) METHOD AND SYSTEM FOR DISTRIBUTING ELECTRONIC CONTENT TO MULTI-PARTY USERS IN MOBILE COMMUNICATION NETWORK

(75) Inventor: Dae-Gunn Jei, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 610 days.

(21) Appl. No.: 11/019,884

(22) Filed: Dec. 21, 2004

(65) Prior Publication Data

US 2005/0148322 A1 Jul. 7, 2005

(30) Foreign Application Priority Data

Jan. 3, 2004 (KR) ...................... 10-2004-0000200

(51) Int. Cl.
*H04Q 7/22* (2006.01)

(52) U.S. Cl. ................. 455/412.1; 455/414.1; 455/418; 455/419

(58) Field of Classification Search .............. 455/412.1, 455/403, 502, 503, 422, 414.1, 419, 550.1, 455/466, 418, 416; 709/213, 200, 206
See application file for complete search history.

(56) References Cited

U.S. PATENT DOCUMENTS

| 6,034,832 | A | 3/2000 | Ichimura et al. | |
|---|---|---|---|---|
| 6,524,189 | B1 * | 2/2003 | Rautila | .......................... 463/40 |
| 2002/0065074 | A1 * | 5/2002 | Cohn et al. | .................. 455/422 |
| 2003/0060190 | A1 * | 3/2003 | Mallart | ........................ 455/414 |
| 2004/0162094 | A1 * | 8/2004 | Riikonen et al. | ............. 455/502 |
| 2005/0037740 | A1 * | 2/2005 | Smith et al. | .............. 455/414.1 |
| 2006/0069711 | A1 * | 3/2006 | Tsunekawa et al. | .......... 709/200 |
| 2006/0085503 | A1 * | 4/2006 | Stoye et al. | .................. 709/206 |

FOREIGN PATENT DOCUMENTS

| CN | 1658594 | 8/2005 |
|---|---|---|
| EP | 1 033 652 | 9/2000 |
| EP | 1 045 388 | 10/2000 |
| EP | 1 066 867 | 1/2001 |
| EP | 1 530 342 | 5/2005 |
| JP | 2003-195969 | 7/2003 |
| KR | 2001-0097079 | 11/2001 |

* cited by examiner

Primary Examiner—Tan Trinh
(74) Attorney, Agent, or Firm—The Farrell Law Firm, PC

(57) ABSTRACT

Disclosed is a method and a system for efficiently distributing electronic content such as game software to a plurality of users in a mobile communication network or a system including a plurality of mobile stations, In order to distribute an electronic content to a plurality of mobile stations after one mobile station receives and stores the electronic content having a license or a copyright from a server or a system having content, the mobile station distributes duplicates of the electronic data to other mobile stations, In addition, when the distributed content is executed, each mobile station determines whether or not operational grant is permitted so as to use the electronic content, Furthermore, when the distributed electronic content is executed in each mobile station, the mobile station uses electronic content after determining whether or not a mobile station distributing the content permits operational grant.

13 Claims, 8 Drawing Sheets

|  | DATA TYPE | DATA FORMAT |
|---|---|---|
| COMPULSORY OR SELECTIVE AREAS | COPY FREQUENCY DATA | NUMBER OF TIMES BY WHICH ORIGINAL CONTENT IS COPIED |
|  | TIME CONDITION DATA | DATA OR TIME IN WHICH COPY OF CONTENT IS PERMITTED OR FORBIDDEN |
|  | CONTENTS SERVER ID | IDENTIFIER OF SERVER HAVING STORED CONTENT OR IDENTIFIER OF BASE STATION DELIEVERING CONTENT |
|  | DIGITAL CERTIFICATION DATA | DIGITAL AUTHENTICATION DATA THROUGH ENTITIES (TERMINAL NAME, SERIAL NUMBER, EXPIRATION TIME, PUBLIC KEY) |
|  | LOCAL NETWORK ID | LOCAL NETWORK ID FOR CONTENT EXECUTION |

FIG.4

METHOD AND SYSTEM FOR DISTRIBUTING ELECTRONIC CONTENT TO MULTI-PARTY USERS IN MOBILE COMMUNICATION NETWORK

PRIORITY

This application claims priority to an application entitled "Method and System for Distributing Electronic Content to Multi-Party Users in Mobile Communication Network" filed in the Korean Intellectual Property Office on Jan. 3, 2004 and assigned Serial No. 2004-200, the contents of which are incorporated herein by reference.

BACKGROUND OF THE INVENTION

1. Field of the Invention

The present invention relates to a method and a system for efficiently distributing electronic content such as game software to a plurality of users in a mobile communication network or a system including a plurality of users.

2. Description of the Related Art

As the development of mobile communication networks and their services advances, it has become more commonplace that users of the mobile communication networks purchase, and use, software or electronic content, such as game software, from a service provider by using a mobile station.

European Patent No. 1,066,867 discloses a technology in which a plurality of mobile stations connect to each other through a network and perform common works such as a game, or other such application with an electronic content which each mobile station have individually-purchased from a server or a system.

Also, it is possible to provide a local network connection between the mobile stations without a central (i.e., a centrally-located) server system or base station. That is, as Bluetooth or an IEEE 802 technique is realized in the mobile station, a work using the electronic content can be performed under a local network environment without the base station. In detail, in U.S. Pat. No. 6,524,189, a multi-player game system is disclosed in which a short-haul connectivity is established between a plurality of mobile stations, and a game device connected to each mobile station plays games in cooperation with other game devices through the established short-haul connectivity. At least one mobile station sends the games (electronic content purchased by the users) to the game devices. The game devices have group selection interfaces for selecting groups capable of participating in the games.

FIG. 1 illustrates a structure of a typical system distributing electronic content to a plurality of users in the mobile communication network.

Each of terminals 130, 140, 150 and 160 receives the electronic content from a server 120 storing the electronic content and linked with a base station 110. Each of the terminals 130 to 160 can individually perform a work using the electronic content. In addition, the terminals 130 to 160 can construct a local network and perform the work using the electronic content through the local network.

FIG. 2 is a block diagram showing a structure of a primary mobile station or a secondary mobile station shown in FIG. 1.

A user input unit 210 is a unit allowing a user to input data or commands thereto such that the user can perform dialing, a menu adjustment function, and a mobile station control function. The user input unit 210 may be realized as a key pad. A display part 220 displays dial numbers (e.g., telephone numbers, etc.) input by the user, an input dial number searching command, a terminal setting command, etc. Also, the display unit 220 can be used for showing electronic content. For example, the display unit 220 displays a game when the user does not perform a voice communication function of the mobile station. A control unit 250 processes a user input delivered through the user input unit 210 and controls an operation of the display unit 220. A speak/microphone 270 receives or outputs voices or sounds required for voice communication, voice guidance, voice recognition, electronic content support, etc. A first signal transmitting/receiving unit 261 includes a first transceiver for connecting the mobile station to a wireless network. A second signal transmitting/receiving unit 262 includes a second transceiver used for operating a local network between mobile stations. An example of such transceivers can include a Bluetooth radio module. The Bluetooth radio module can operate with low power in a band of 2.4 GHz. Bluetooth is a wireless local area network (WLAN) technique which currently provides a data rate of 1 Mbps. Moreover, a Bluetooth Special Interest Group aims at realizing a data rate of 2 Mbps in the future. It should be further noted, that, Bluetooth is used for a point-to-point communication system or a point-to-multi-point communication system.

The above-described local network 170 (illustrated using dotted lines) as shown in FIG. 1 is constructed through the second signal transmitting/receiving unit 262 of each mobile station. Each mobile station can perform a network-based operation by using its own electronic content. For example, if content for a game supporting a network play mode in which a plurality of users participate, is stored in each of mobile stations, the game is played by linking network interfaces of content stored in the mobile stations. In order to perform the above-described network operation, it is presumed that each mobile station must have common or flexible electronic content. As represented by a reference numeral 51 or 53 of FIG. 1, each of the mobile stations 130 to 160 can obtain the electronic content by connecting to the content server 120 through the base station 110 so as to be able to purchase or to receive the electronic content from the content server 120.

However, if new electronic content has recently been released or there are only a few users using the new electronic content, a great deal of time is required until the electronic content is sufficiently distributed such that a great number of mobile station users possess the new electronic content. When one or more mobile station users use the new electronic content prior to the use of the electronic content by other users, the prior users have the opportunity to persuade others of the superiority or the desirability of the electronic content and, thus, to persuade them to purchase the new electronic content data. Moreover, although prior users can aid in the distribution of the new electronic content by sending simple information or by using another in methods to inform other mobile station users (e.g., new users) of the new electronic content, a great amount of time is required until other mobile station users receiving the method or the information to purchase, install, and execute the recommended electronic content which inconveniences the users of the mobile stations. The fact that a great amount of time is required as described above has negative influence on distribution of the electronic content. In addition, the above-described conventional technique has the following problems.

First, when a plurality of mobile stations perform either a stand-alone operation or a network-based operation (a multi-party operation), each mobile station must individually connect to a server and separately receive electronic content. However, a current available system cannot distribute electronic content to the terminals due to copyright protection measures of the electronic content.

Second, when one mobile station distributes electronic content to other mobile stations due to a reason that the mobile station sets a high valuation on the content transmitted from a server, the mobile station can provide other mobile stations only with a method for acquiring the content. Accordingly, other mobile stations cannot acquire the electronic content by connecting to the server in the same manner as a connection procedure of the mobile station in order to acquire the content. Moreover, mobile stations can cancel acquisition of the content due to difficulty of connection of the server and other mobile stations. As a result, work, using the electronic content, cannot be performed in accordance with an intention of a mobile station user. For example, when one mobile station user wants to inform other mobile station users of the superiority of a game purchased and used by the mobile station user or when one mobile station wants to play a game using game content supporting a multi-party play together with other mobile station users, the mobile station user having already purchased the game content can induce other mobile station users to purchase and use the game content through a method for purchasing the game content (a method for informing a URL on a WAP browser or a server or a network to be connected) in the conventional technique. However, this method is complicated and requires a great amount of time and may discourage other mobile station users from to purchasing or transmitting the game content.

U.S. Pat. No. 6,034,832 discloses storage of copy management data in addition to data of a recording medium such as CDs or DVDs, wherein the copy management data is used to adjust conditions such as restrictions on time and place for using the data. The copy management data are added to raw data and stored in the recording media. However, the patent relates to data stored in disc-type recording media and copy thereof and is irrelevant to electronic content distribution under a network environment. European Patent No. 1,045,388 relates to a method for managing a copyright by adding a descriptor to multimedia content and changing a flag. However, this patent is irrelevant to electronic content distribution under a network environment.

Japan Patent Publication No. 2003-195969 relates to a system for distributing game content to a mobile station, wherein, a mobile station connects to a server by linking an information output device with an external connection port of the mobile station and provides an authentication function and an additional function when game content is provided. However, this patent requires an additional apparatus provided outside of the mobile station in order to distribute and manage the game content, thereby increasing the price of the mobile station and making it inconvenient to manage the mobile station.

Korea Patent Publication No. 2001-0097079 discloses a system and a method for playing a network game using direct communication (a local network) between mobile stations. In this system and method, since the mobile stations need not connect to a server or a base station, they do not have a burden of an additional communication fee. However, since a content provider and a service provider developing and distributing content would not supply the content if a copyright of the contents were not protected, this system and method is not commercially viable.

European Patent No. 1,033,652 discloses a method for allowing a mobile station to download software from a server storing software. However, this patent does not disclose a technology for constructing a network and transmitting software between mobile stations.

SUMMARY OF THE INVENTION

Accordingly, the present invention has been made to solve the above-mentioned problems occurring in the prior art, and an object of the present invention is to provide a method and a system, which can efficiently distribute electronic content to a plurality of mobile stations under a network environment.

Another object of the present invention is to provide a method and a system, which can distribute electronic content having a license or a copyright to plurality of mobile stations.

To accomplish the above and other objects according to the present invention for distributing a plurality of users to electronic content, after one mobile station receives and stores the electronic content having a license or a copyright from a server or a system having content, the mobile station distributes a duplicate to other mobile stations.

In addition, when the distributed content is executed, each mobile station determines whether or not an operational grant is permitted so as to use content.

Furthermore, when the distributed content is executed in each mobile station, the mobile station uses content after determining whether or not a mobile station distributing the content permits an operational grant.

In addition, when the distributed content is executed in each mobile station, the mobile station uses content after determining whether or not a server permits operational grant for the content.

BRIEF DESCRIPTION OF THE DRAWINGS

The above and other objects, features and advantages of the present invention will be more apparent from the following detailed description taken in conjunction with the accompanying drawings, in which:

FIG. 4 is a table for explaining a DMD structure according to a preferred embodiment of the present invention;

DETAILED DESCRIPTION OF THE PREFERRED EMBODIMENT

Figure 1:
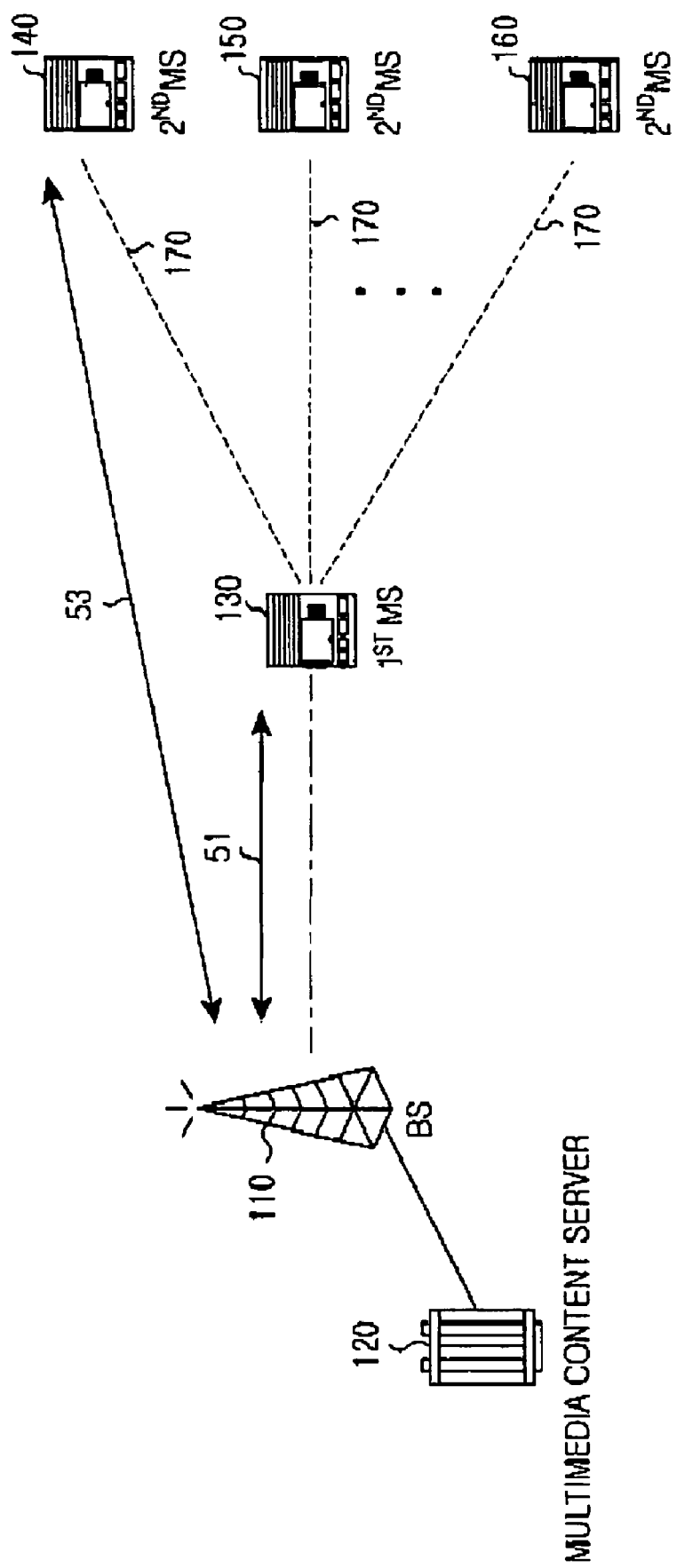
FIG. 1 illustrates a structure of a typical system for distributing electronic content to a plurality of users in a mobile communication network.

Hereinafter, preferred embodiments of the present invention will be described in detail with reference to the accompanying drawings. Note that the same or similar components in drawings are designated by the same reference numerals although they are shown in different drawings. In the following description of the present invention, a detailed description of known functions and configurations incorporated herein will be omitted when it may make the subject matter of the present invention unclear.

Figure 3:
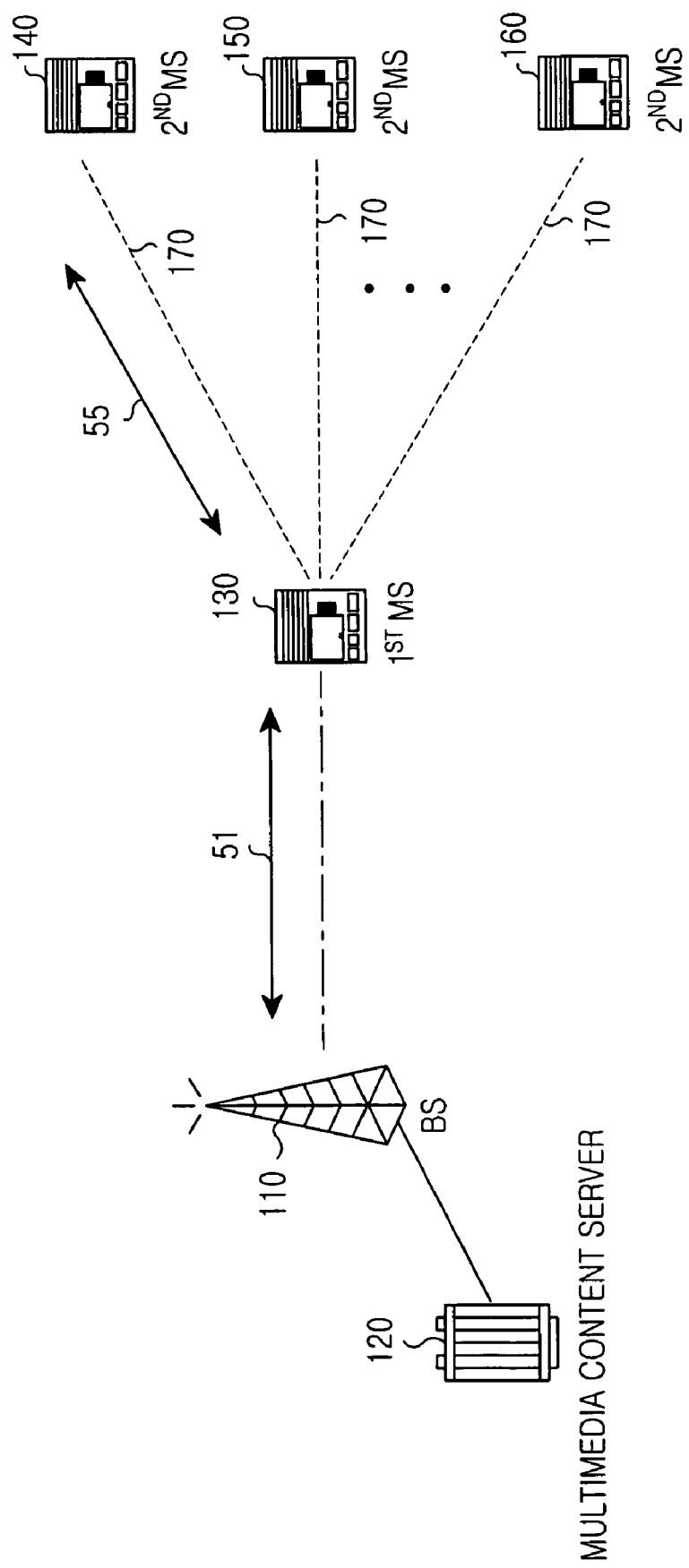
FIG. 3 illustrates a structure of a system for distributing electronic content to a plurality of mobile stations in a mobile communication network according to a preferred embodiment of the present invention.

FIG. 3 illustrates a structure of a system for distributing electronic content to a plurality of mobile stations in a mobile communication network according to a preferred embodiment of the present invention.

Figure 2:
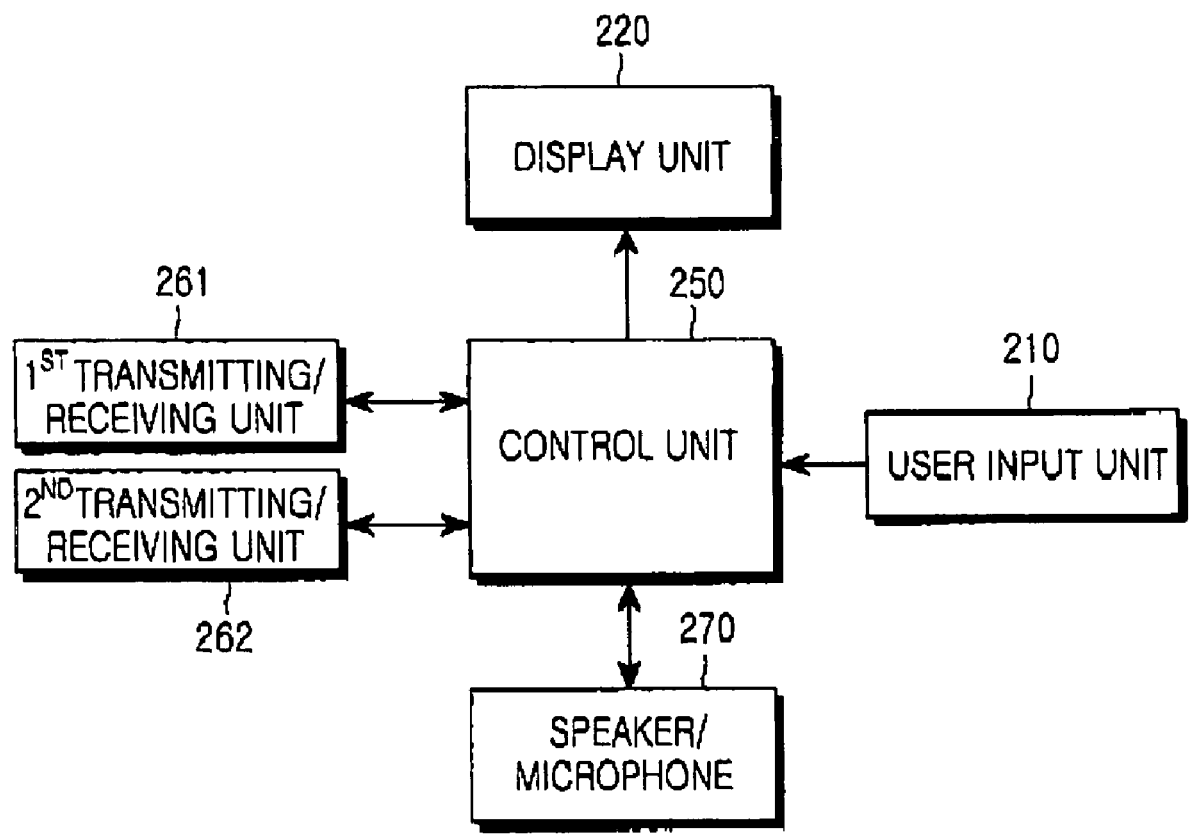
FIG. 2 is a block diagram showing a structure of a typical primary mobile station or a secondary mobile station shown in FIG. 1.

A primary mobile station (a primary terminal) 130 or second mobile stations (secondary terminals) 140, 150 and 160, respectively have the same block structure as the above-described mobile stations which are shown in FIG. 2.

The base station 110 is connected to the primary terminal 130 through a wireless network and transmits/receives typical mobile communication services such as voice communication to and from the primary terminal 130. The base station 110 is connected to the server 120. The server 120 has electronic content to be used by the primary terminal 130. Similarly to the primary terminal 130, and the secondary terminals 140, 150, and 160 are connected to the base station 110 through the wireless network in order to provide typical mobile communication services such as voice communication.

According to the present invention, distribution management data (DMD) are added to electronic content stored in the server 120 shown in FIG. 3 in order to efficiently distribute the electronic content.

FIG. 4 is an illustration showing a table for explaining an exemplary structure of the DMD according to a preferred embodiment of the present invention.

The DMD may have various fields for distribution and management of data. For example, a copy frequency data field contains information on the number of times by which original content stored in the server can be copied. In detail, the copy frequency data field contains information on the number of times by which the original content can be sent and copied to the secondary terminals 140, 150, and 160 through the primary terminal, i.e., the number of the secondary terminals receiving the original content. A date-and-hour condition data field indicates a date or a time when copy of the content is permitted or forbidden. For example, after the content is delivered to the primary terminal from the server, if copy for the content is permitted only during a specific time, sales promotion content of either a content creator or a service provider can be distributed. Also, in this date-and-hour condition data field, a permission date and a forbiddance date for the copy of the content can be arbitrarily set according to necessity as desired. A content server ID is an identifier of the server 120 having stored the content or an identifier of the base station 110 delivering the content. If a step of checking the content server ID is inserted when the primary terminal or the secondary terminal executes the content, it is possible to prevent other terminals from using the content, which are not managed by the content server or the service provider, that is, other terminals which have subscribed to other service providers. A digital certificate data field includes information about a digital authentication key. The content server or the base station plays a role of a certification authority (CA) or provides a connection with the CA. Through the digital certificate data field, a terminal name, a serial number, an expiration time, a public key, etc. are provided. The terminal can confirm that a copy of the content is permitted through an operation for both the public key and a private key of the terminal by using the value of the digital certificate data field. Otherwise, it can be found whether or not the copy of the content is permitted through a step of checking the terminal name, a serial number, etc. A digital certificate can be realized on the basis of an X.509 standard. When content is distributed to terminals and used to construct a local network, a local network ID field may be used to search for and/or find a local network ID in view of a protocol included in the local network and use a detected ID in constructing the local network. For example, in constructing the local network between the primary terminal and the secondary terminal by using the Bluetooth technique, a protocol of each terminal must support a personal area network profile, and the personal area network profile defines a protocol format required for constructing a network access point or a group ad-hoc network. Herein, the copyrights of content can be protected through a method in which network construction can be permitted when a permitted local network ID is found by checking a local network ID through a communication procedure of profiles of the mobile stations. Each field of the DMD described above can be selectively configured according to individual requirements of the user. Moreover, other fields corresponding to a similar purpose may be included in the DMD.

As described above, when the DMD is added to raw content and terminals require the content, the content is transferred to a primary terminal. The content transferred to the primary terminal is stored in the primary terminal and then transferred to a secondary terminal if there is the secondary terminal for constructing a local network together with the primary terminal. The secondary mobile terminal stores the received content and executes the content. At this time, the content may be executed in network work between the first primary terminal and the secondary terminal, or in an individual work of each terminal.

Figure 5:
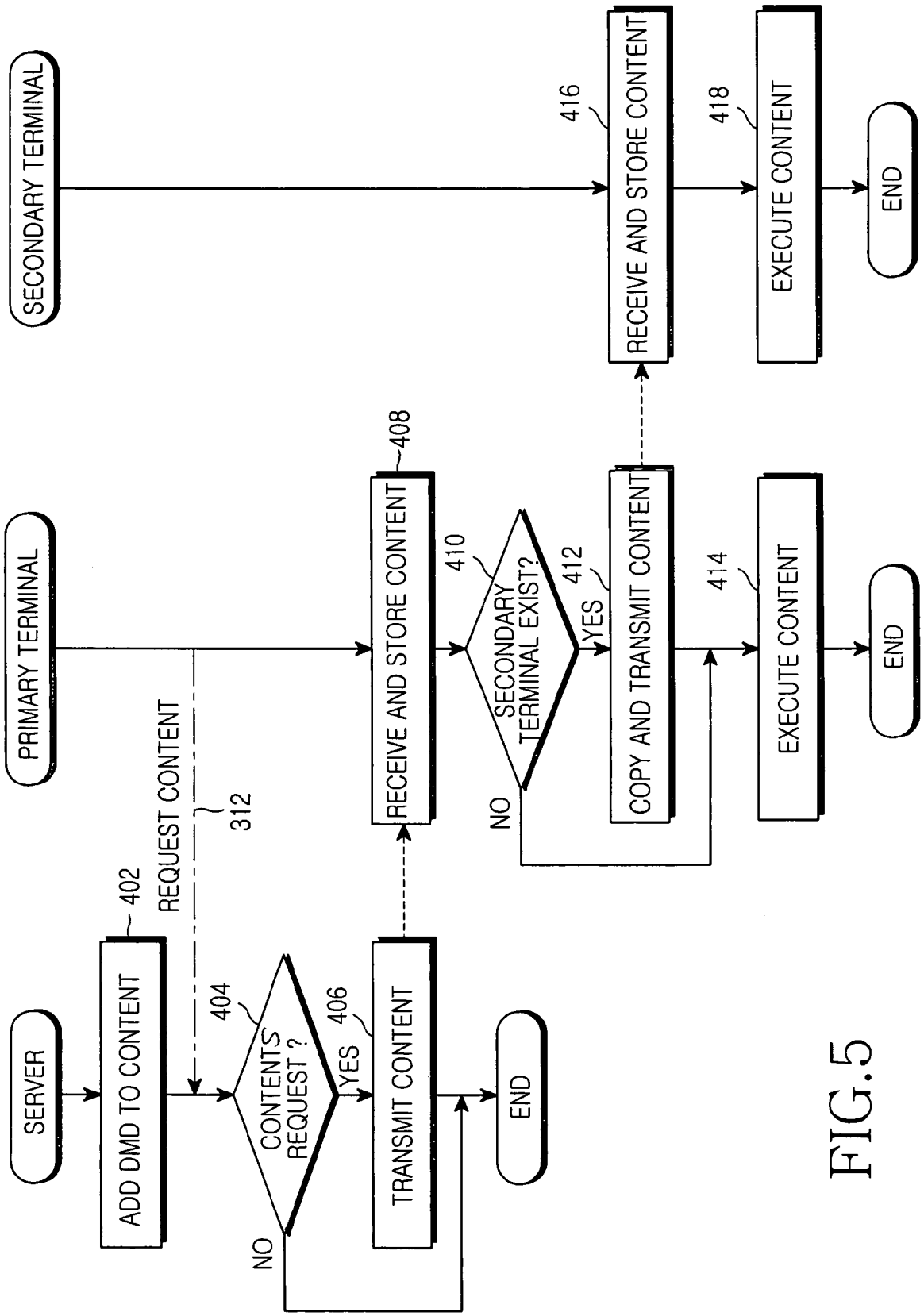
FIG. 5 is a flow diagram illustrating a distribution procedure of a method for distributing electronic content to plural users in a mobile communication network according to a first embodiment of the present invention.

FIG. 5 is a flow diagram showing a distribution procedure of a method for distributing electronic content to a plurality of users in the mobile communication network according to the first embodiment of the present invention.

Herein, a server denotes the server 120 shown in FIG. 2, a primary terminal denotes the primary terminal 130 shown in FIG. 2, and a secondary terminal denotes one of the secondary terminals 140 to 160 shown in FIG. 2.

The server adds the DMD to content in step 402. If the server detects a request for the content from the primary terminal in step 404, the server transmits the corresponding content to the primary terminal in step 406. If the request for the content is not detected in step 404, the server terminates work.

The primary terminal receives and stores the content transmitted from the server in step 408. In step 410, it is determined whether or not there is the secondary terminal through communication between the second transmitting/receiving units 262s of the terminals. If a secondary terminal exists, the primary terminal duplicates the content so as to transmit the duplication to the secondary terminal in step 412. Herein, the content is operated in step 414 or in a situation where the secondary mobile terminal does not exist.

The secondary terminal receives and stores content transmitted from the primary terminal in step 416, and then, executes the content in step 418.

Figure 6:
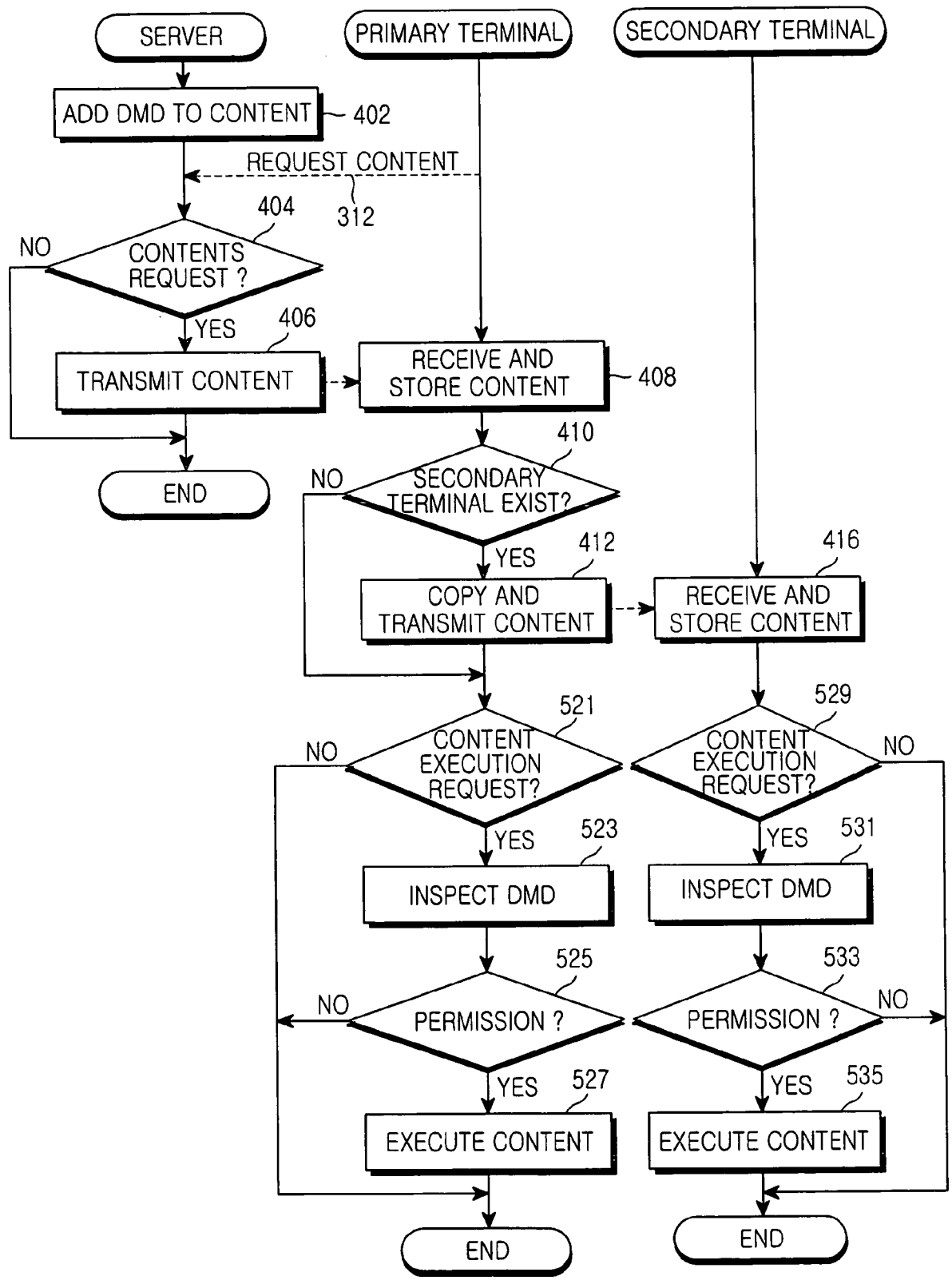
FIG. 6 is a flow diagram illustrating a distribution procedure of a method for distributing electronic content to plural users in a mobile communication network according to a second alternative embodiment of the present invention.

FIG. 6 is a flow diagram showing a distribution procedure of a method for distributing electronic content to plurality of users in the mobile communication network according to a second alternative embodiment of the present invention.

In comparison with the operation of the server shown in FIG. 5, the server shown in FIG. 6 performs the same operation as the server shown in FIG. 5. Also, operations performed prior to the primary terminal and the secondary terminal receiving and storing content (e.g., step 408 to step 412, and step 416) are identical to the operation of the primary terminal and the secondary terminal shown in FIG. 5. Accordingly, redundant description about these operations will be omitted for the sake of clarity.

After copying and transmitting the electronic content in step 412, the primary terminal checks in step 521 whether or not a request for content execution (by the user of the terminal) is detected. If the request for the content execution is detected, the primary terminal examines the DMD in step 523 and checks whether or not the content execution has been permitted by analyzing a check result in step 525. If the content execution has been permitted, the content is executed in step 527. In contrast, if the request for the content execution is not detected in step 521 or the content execution has not been permitted in step 525, the work is terminated.

The secondary terminal receives and stores the content in step 416, and then, determines whether or not a request for the content execution of a user is detected in step 529. If the content execution of a user is detected, the secondary terminal inspects DMD in step 531 and determines whether or not an inspection result is analyzed and the content execution is permitted in step 533. If the content execution is permitted, the content is executed in step 535. In contrast, if the request for the content execution is not detected in step 529 or the content execution has not been permitted in step 533, the work is terminated.

When network work is required between the primary terminal and the secondary terminal, each terminal examines the DMD which is added to the content. If there is a license, each terminal performs the network work relating to the content. In the meantime, there are a variety of methods for searching for the license in each terminal. Among other things, there is a method for performing an operation, etc., using both a public key and a private key of each terminal included in the digital certificate data field of the DMD.

Figure 7:
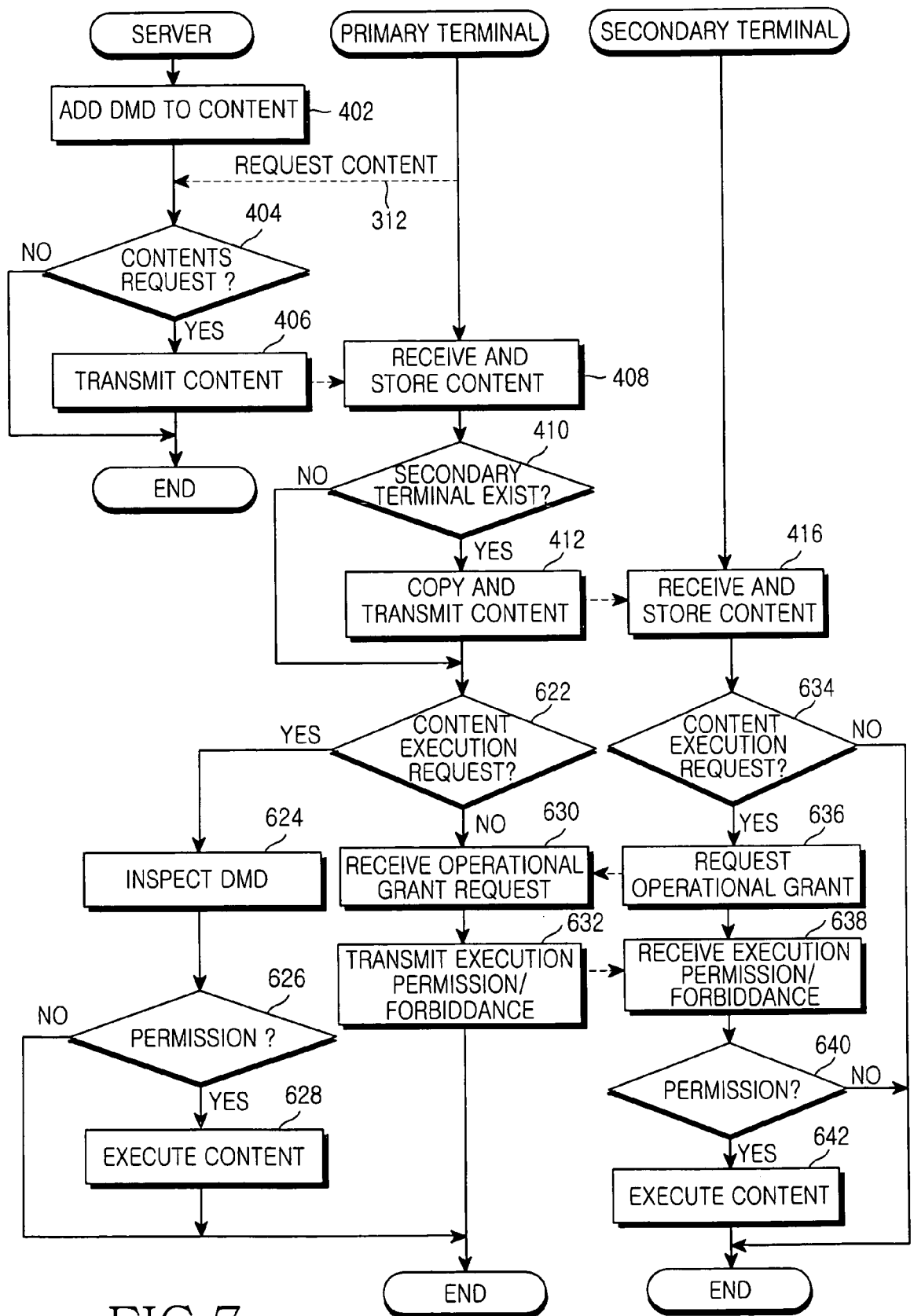
FIG. 7 is a flow diagram illustrating a distributing procedure of a method for distributing electronic content to plural users in a mobile communication network according to a third alternative embodiment of the present invention.

FIG. 7 is a ladder diagram showing a distributing procedure of a method for distributing electronic content to a plurality of users in the mobile communication network according to a third preferred embodiment of the present invention.

In comparison with the above-described operation of the server shown in FIG. 5, the server shown in FIG. 7, performs the same operation as the server shown in FIG. 5. Also, the performed prior to the primary terminal and a secondary terminal receiving and storing content (e.g., step 408 to step 412, and step 416) are identical to the operation of the primary terminal and the secondary terminal shown in FIG. 5. Accordingly, redundant description about these operations will be omitted for the sake of clarity.

A primary terminal copies and transmits content in step 412, and then, checks in step 622 whether a request of a user for content execution is detected. If the request for the content execution is not detected, the primary terminal receives a request for a license in step 630 and transmits a permission response/a forbiddance response for the content execution in step 632. If the request for the content execution is detected in step 622, steps 624, 626, and 628 are performed similarly to steps 523, 525, and 527 of FIG. 5, respectively.

A secondary terminal receives and stores the content in step 416, and then, checks in step 634 whether a request by the user for the content execution is detected. If the request for the content execution is detected, the secondary terminal requests an operational grant in step 636 and receives the permission response forbiddance response for the content execution sent from the primary terminal in step 638. The secondary terminal checks whether the content execution has been permitted in step 640. If the content execution has been permitted, the secondary terminal executes the content in step 642. In contrast, if the request for the content execution is not detected in step 634 or the content execution is not permitted in step 640, the network work is terminated.

The third embodiment differs from the second embodiment in that the third embodiment includes a step of requiring an operational grant to the primary terminal from the secondary terminal when users request the content execution in each terminal. The primary terminal constructs a local network together with the secondary terminal. For example, the primary terminal plays a role of a master mobile terminal in a Bluetooth network. When the primary terminal constructs a network together with secondary terminals, the primary terminal can exercise the operational grant by permitting or forbidding the content execution by secondary terminals wanting to participate in the network on the basis of DMD (containing information about the number of copies) included in the content of the primary terminal.

There are various cases of exercising the operational grant. Two examples of such cases are as follows.

Restriction on objects: on the assumption that the primary terminal purchases and stores content enabling the primary terminal to construct a local network together with five secondary terminals, the primary terminal distributes the content only to five secondary terminals even though more than five secondary terminals require access the local network or the content.

Restriction on time: on the assumption that a content provider has manipulated the DMD of distributed content in such a manner that the distributed content is executed only for three days because the content is distributed for a sales promotion, when five secondary terminals intend to execute the content, the primary terminals and the secondary terminals can copy, transmit/receive, or execute the content for only three days according to designation of the DMD.

Figure 8:
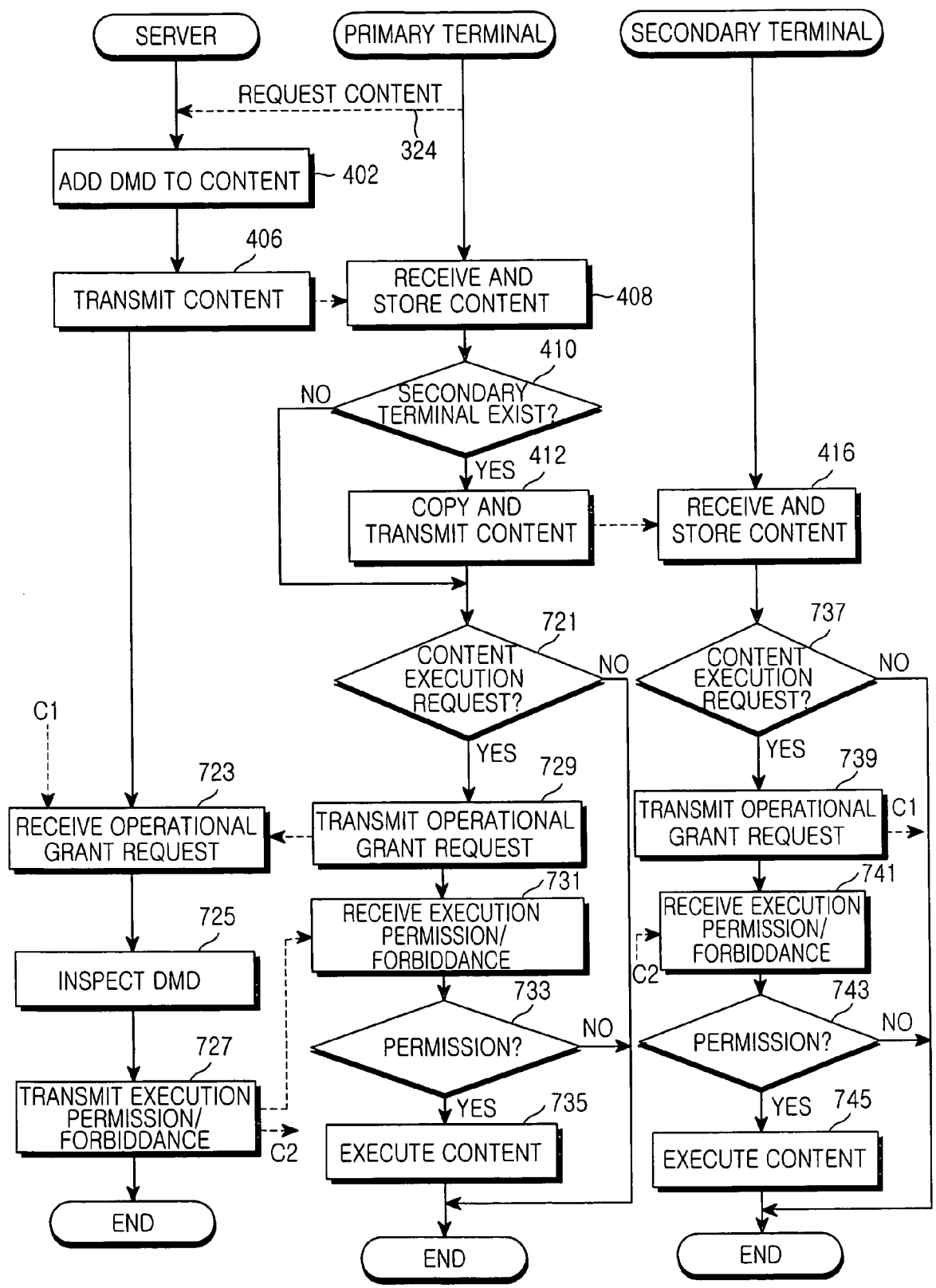
FIG. 8 is a flow diagram illustrating a distributing procedure of a method for distributing electronic content to plural users in a mobile communication network according to a fourth alternative embodiment of the present invention.

FIG. 8 is a flow diagram showing a distributing procedure of a method for distributing electronic content to plurality of users in the mobile communication network according to a fourth preferred embodiment of the present invention.

In comparison with the operation of the server shown in FIG. 5, an operation (step 408 to step 412, and step 416) until a primary terminal and a secondary terminal receive and store content is identical to the operation of the primary terminal and the secondary terminal shown in FIG. 5. Accordingly, redundant description about the operations will be omitted.

When receiving a request for the content from the primary terminal, the server adds DMD to the content in step 402, in which the DMD has values of various fields adjusted according to a content distribution purpose and desire of a content provider or as defined by a contract between a terminal user and a content provider (or a service provider).

After the server transmits the content in step 406, if the server receives an operational grant request (C1) transmitted from the primary terminal in step 723, the server checks the DMD in step 725. In step 727, the server analyzes a check result and transmits an operation permission/forbiddance response (C2) to the primary terminal. The server checks the specific data fields of the DMD or individually requested data of each terminal and then can permit the operational grant.

The primary terminal copies and transmits the content in step 412, and then, checks whether a request for a content execution of a user is detected in step 721. If the request for the content execution of the user is detected, the primary terminal transmits the operational grant request to the server in step 729 and receives the operation permission/forbiddance response transmitted from the server in step 731. Also, if the primary terminal determines in step 733 that the operation permission response has been received, the primary terminal executes the content in step 735. In contrast, if the request for the content execution is not detected in step 721, or the operation forbiddance response (C2) is received in step 733, the primary terminal terminates the content execution work.

The secondary terminal receives and stores the content in step 416, and then, in step 737, checks whether the content execution request of the user is detected. If the content execution request of the user is detected, the secondary terminal transmits the operational grant request (C1) to the server (or a base station) in step 739. After that, the secondary terminal receives the operation permission/forbiddance response transmitted from the server in step 741. Also, after checking the received response, if the secondary terminal determines in step 743 that the operation permission response is received, the secondary terminal operates the content in step 745. In contrast, if the content execution request is not detected in step 737 or the execution forbiddance response is received in step 743, the secondary terminates the content execution work.

In the third embodiment, two terminals requests the operational grant to the server (or base station). However, it is expected that the primary terminal purchases content through billing in most cases. Therefore, it is natural that the primary terminal receive the operational grant while purchasing the content. Accordingly, only the secondary terminal can request the content operational grant.

Each terminal having received the operational grant executes content by constructing a network between terminals or by individually executing the content. Although it is not shown, hereinafter, description about content execution will be given in detail by way of example. When the content is executed in a terminal, an authentication is required. In other words, each terminal transmits its own ID or various fields (e.g., a base station ID, a digital authentication data, etc.) included in DMD to a server through a base station. The server checks the fields transmitted from each terminal and sends an operational grant of the content and data corresponding to the operational grant to each terminal. Then, each terminal receives this so as to execute the content.

As described above, according to the present invention, a user of one terminal can purchase and receive electronic content from a content server, and distribute the content to users of other terminals, in which the electronic content includes an authorization which allows the user to distribute the content to users of other terminals. Advantages according to the present invention are as follows.

First, since one terminal can efficiently distribute available content to neighboring terminals, content distribution is activated.

Second, profits of content providers or service vendors increase and content with superior quality can be developed by easily protecting the copyrights of the content. This is because information required for management of the content, such as the range of the distribution, the number of usage of content, etc., is added to the content and transmitted when the content is distributed and it is determined whether or not the content execution is legal when the content is executed.

Third, when distributing content of a mobile station, since test content having restricted authority can be used before the content is purchased, extravagances resulting from rapid content purchase are minimized. Also, an accounting system for a copyright holder can be guaranteed even though the content is distributed as described above. That is, the copyright holder can receive a rental fee or royalties from each user, content providers or service vendor.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A system for distributing electronic content to a plurality of users in a mobile communication network, the system comprising:
   a server for adding distribution management data to content and transmitting content having the distribution management data if a request for content from an external system exists;
   a primary mobile station for storing, executing, copying, and transmitting the content received from the server; and
   at least one secondary mobile station for storing and executing the content received from the primary mobile stations,
   wherein the primary mobile station and the secondary mobile station inspect the distribution management data if a content execution request is detected, and then, executes the content if content execution is permitted.

2. The system as claimed in claim 1, wherein the primary mobile station is connected to the secondary mobile station through a local network.

3. The system as claimed in claim 2, wherein the distribution management data includes copy frequency data representing a frequency approved in such a manner that original content can be copied, time condition data representing a date or a time in which copy of the content is permitted or forbidden, a content server identification representing an identification of the server storing the content or an identification of the base station delivering the content, digital authentication data, or a local network identification.

4. The system as claimed in claim 1, wherein the server wirelessly communicates with the primary mobile station through a base station.

5. The system as claimed in claim 4 wherein the distribution management data includes copy frequency data representing a frequency approved in such a manner that original content can be copied, time condition data representing a date or a time in which copy of the content is permitted or forbidden, a content server identification representing an identification of the server storing the content or an identification of the base station delivering the content, digital authentication data, or a local network identification.

6. The system as claimed in claim 1, wherein the primary mobile station transmits an operational grant permission/forbiddance response if a content execution request is detected and an operational grant is detected from the external system, inspects the distribution management data if the operational grant is not detected, and if execution of the content is permitted executes the content, and the secondary mobile terminal requests the operational grant to the primary mobile station if the content execution request is detected and executes the content if the content execution is permitted.

7. The system as claimed in claim 6, wherein the distribution management data includes copy frequency data representing a frequency approved in such a manner that original content can be copied, time condition data representing a date or a time in which copy of the content is permitted or forbidden, a content server identification representing an identification of the server storing the content or an identification of the base station delivering the content, digital authentication data, or a local network identification.

8. The system as claimed in claim 1, wherein the server inspects the distribution management data and transmits a content execution permission/forbiddance response if an operational grant request is detected from the external system, and the primary mobile station requests operational grant to the server if the content execution request is detected and executes the content if content execution is permitted.

9. The system as claimed in claim 6, wherein the distribution management data includes copy frequency data representing a frequency approved in such a manner that original content can be copied, time condition data representing a date or a time in which copy of the content is permitted or forbidden, a content server identification representing an identification of the server storing the content or an identification of the base station delivering the content, digital authentication data, or a local network identification.

10. The system as claimed in claim 1, wherein the distribution management data includes copy frequency data representing a frequency approved in such a manner that original content can be copied, time condition data representing a date or a time in which copy of the content is permitted or forbidden, a content server identification representing an identification of the server storing the content or an identification of the base station delivering the content, digital authentication data, or a local network identification.

11. A method for distributing electronic content in a mobile communication network which includes a server for storing electronic content having distribution management data, a primary mobile station capable of communicating with the server, and at least one secondary mobile station capable of communicating with the primary mobile station, the method comprising the steps of:
   1) transmitting a request for electronic content to the server by the primary mobile station;
   2) receiving and storing by the primary mobile station the electronic content transmitted from the server in response to an electronic content request;
   3) copying and transmitting by the primary mobile station the electronic content receiving and storing by the secondary mobile station the electronic content;
   4) checking by the primary mobile station and the secondary mobile station whether a content execution request by a user exists;
   5) inspecting by the primary mobile station and the secondary mobile station the distribution management data if the content execution request exists; and
   6) executing by the primary mobile station and the secondary mobile station the electronic content if content execution is permitted.

12. A method for distributing electronic content in a mobile communication network which includes a server for storing electronic content having distribution management data, a primary mobile station capable of communicating with the server, and at least one secondary mobile station capable of communicating with the primary mobile station, the method comprising:
   1) transmitting a request for electronic content to the server by the primary mobile station;
   2) receiving and storing by the primary mobile station the electronic content transmitted from the server in response to an electronic content request;
   3) copying and transmitting by the primary mobile station the electronic content and receiving and storing by the secondary mobile station the electronic content;
   4) checking by the primary mobile station or the secondary mobile station whether a user has requested content execution and requesting an operational grant to the server if the request for the content execution exists;
   5) inspecting the distribution management data if the server receives a request for the operational grant and transmitting a content execution permission/forbiddance response; and
   6) receiving by the primary mobile station or the secondary mobile station the content execution permission/forbiddance response and executing the electronic content if the content execution has been permitted.

13. A method for distributing electronic content in a mobile communication network which includes a server for storing electronic content having distribution management data, a primary mobile station capable of communicating with the server, and at least one secondary mobile station capable of communicating with the primary mobile station, the method comprising the steps of:
   1) transmitting a request for electronic content to the server by the primary mobile station;
   2) receiving and storing by the primary mobile station the electronic content transmitted from the server in response to an electronic content request;
   3) copying and transmitting by the primary mobile station the electronic content and receiving and storing by the secondary mobile station the electronic content;
   4) executing the electronic content by the primary mobile station and the secondary mobile station,
   wherein, in step 4), the primary mobile station performs the steps of:
   2-1) checking whether a request for content execution of a user exists;
   2-2) inspecting the distribution management data if the request for the content execution of the user exists and executing the electronic content if the content execution is permitted; and
   2-3) transmitting a content execution permission/forbiddance response to the secondary mobile station when an operational grant request is received from the secondary mobile station if the request for the content execution of the user does not exist, and
   the secondary mobile station performs the steps of:
   3-1) checking whether a request for content execution of a user exists;
   3-2) requesting an operational grant to the primary mobile station if the request for the content execution of the user exists; and
   3-3) executing the electronic content if the content execution permission/forbiddance response is received from the primary mobile station and the content execution is permitted.

* * * * *